United States Patent
Shi

(10) Patent No.: US 10,509,227 B2
(45) Date of Patent: Dec. 17, 2019

(54) HEAD UP DISPLAY DEVICE AND SYSTEM

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/986,931

(22) Filed: May 23, 2018

(65) Prior Publication Data
US 2019/0041636 A1 Feb. 7, 2019

(30) Foreign Application Priority Data

Aug. 4, 2017 (CN) .......................... 2017 1 0659396

(51) Int. Cl.
*G02B 27/01* (2006.01)
*G02B 27/28* (2006.01)
(Continued)

(52) U.S. Cl.
CPC .......... *G02B 27/0101* (2013.01); *B60K 35/00* (2013.01); *G02B 27/26* (2013.01);
(Continued)

(58) Field of Classification Search
CPC ............... G02B 27/0101; G02B 27/01; G02B 27/0149; B60K 2370/334; G09G 2380/10
See application file for complete search history.

(56) References Cited

U.S. PATENT DOCUMENTS

2005/0052617 A1* 3/2005 Fujikawa ............. G02B 27/225
353/10
2009/0009594 A1* 1/2009 Kawai ................ G02B 27/2278
348/54
(Continued)

FOREIGN PATENT DOCUMENTS

CN 1112688 A 11/1995
CN 1278072 A 12/2000
(Continued)

OTHER PUBLICATIONS

First Office Action for Chinese Patent Application No. 201710659396.4 dated Jun. 27, 2019.

*Primary Examiner* — Koosha Sharifi-Tafreshi
(74) *Attorney, Agent, or Firm* — Calfee, Halter & Griswold LLP

(57) ABSTRACT

The present disclosure provides a head up display device and system, relating to the field of display technology. The head up display device includes: a first display image generator, configured to generate a first linearly polarized light containing a first image; a second display image generator configured to generate a second linearly polarized light containing a second image; wherein the polarization direction of the first linearly polarized light is perpendicular to the polarization direction of the second linearly polarized light; a first polarizing beam splitter configured to combine the first linearly polarized light and the second linearly polarized light; and an optical component containing a plurality of reflective imaging elements, wherein the optical component is configured to reflect the first image and the second image into a user's eye.

12 Claims, 2 Drawing Sheets

(51) Int. Cl.
    *G02B 27/26*     (2006.01)
    *G09G 3/00*     (2006.01)
    *B60K 35/00*     (2006.01)
    *G09G 3/36*     (2006.01)
    *G09G 3/34*     (2006.01)

(52) U.S. Cl.
    CPC ........... *G02B 27/283* (2013.01); *G09G 3/001* (2013.01); *B60K 2370/334* (2019.05); *B60K 2370/34* (2019.05); *B60K 2370/349* (2019.05); *G02B 2027/0134* (2013.01); *G09G 3/3406* (2013.01); *G09G 3/36* (2013.01); *G09G 2320/0626* (2013.01); *G09G 2380/10* (2013.01)

(56) References Cited

U.S. PATENT DOCUMENTS

| | | | |
|---|---|---|---|
| 2010/0238546 A1* | 9/2010 | Hsu | G02B 27/26 359/465 |
| 2011/0096155 A1* | 4/2011 | Choo | H04N 13/398 348/58 |
| 2014/0268353 A1* | 9/2014 | Fujimura | G02B 27/0101 359/630 |
| 2015/0286053 A1* | 10/2015 | Hu | G02B 27/0101 349/11 |
| 2016/0349507 A1* | 12/2016 | Hayashi | H04N 9/3167 |
| 2017/0336628 A1* | 11/2017 | Kim | G02B 5/30 |
| 2017/0357088 A1* | 12/2017 | Matsuzaki | G02B 27/01 |

FOREIGN PATENT DOCUMENTS

| | | |
|---|---|---|
| CN | 1463384 A | 12/2003 |
| CN | 1570711 A | 1/2005 |
| CN | 1579100 A | 2/2005 |
| CN | 1800912 A | 7/2006 |
| CN | 1841180 A | 10/2006 |
| CN | 102087420 A | 6/2011 |
| JP | 2008256961 A | 10/2008 |

\* cited by examiner

HEAD UP DISPLAY DEVICE AND SYSTEM

CROSS-REFERENCE TO RELATED APPLICATIONS

This application claims the benefit of Chinese Patent Application No. 201710659396.4, filed on Aug. 4, 2017 and entitled "HEAD UP DISPLAY DEVICE AND SYSTEM", and the content of which is incorporated by reference herein in its entirety.

TECHNICAL FIELD

The present disclosure relates to the field of display technology, and in particular, to a head up display device and a head up display system.

BACKGROUND

With the development of science and technology, head up display (HUD) systems are increasingly used in automobiles. The important driving information, such as speed, engine revolution, fuel consumption, tire pressure, navigation and external smart device information, may be displayed by vehicle HUD system in real time on the front windshield within the driver's vision field, so that the driver can catch sight of the driving information without hanging his head, and his distraction from the road ahead is accordingly avoided. Meanwhile, the driver need not interchange his eyesight from observing the road ahead to the dashboard nearby. Thus, eye strain is avoided, driving safety is greatly enhanced, and driving experience is improved.

At present, the existing vehicle HUD system is a single-layer virtual image display system which projects the information as characters and/or diagrams to the front windshield by way of optical reflection principle, and the imaging position of the characters and/or diagrams is determined by the optical system. Generally the image is formed a few meters in front of the vehicle In addition, the existing vehicle HUD system can only form a plane image rather than a stereoscopic image. Furthermore, the existing vehicle HUD system is incapable of adjusting the imaging position.

It is noted that the information disclosed in the foregoing background section is merely used for those skilled in the art to enhance their understanding of the background of the present disclosure, and therefore, some other information which is not known to those skilled in the art as prior art may be involved in this section.

SUMMARY OF THE INVENTION

The present disclosure provides a HUD device and system to solve one or more problems caused by limitations and disadvantages of the related art, at least to a certain extent.

According to an aspect of the present disclosure, it provides a HUD device, comprising:

a first display image generator configured to generate a first linearly polarized light containing a first image;

a second display image generator configured to generate a second linearly polarized light containing a second image; wherein the polarization direction of the first linearly polarized light is perpendicular to the polarization direction of the second linearly polarized light;

A first polarizing beam splitter configured to combine the first linearly polarized light and the second linearly polarized light;

An optical component containing a plurality of reflective imaging elements, wherein the optical component is configured to reflect the first image and the second image into a user's eye.

According to an exemplary embodiment of the present disclosure, the first display image generator and the second display image generator are arranged in mirror image with respect to the first polarizing beam splitter.

According to an exemplary embodiment of the present disclosure, the HUD device further comprises:

A quarter wave plate disposed between the first polarizing beam splitter and the optical component, wherein the quarter wave plate is configured to convert the first linearly polarized light in the combined light into a first circularly polarized light, and convert the second linearly polarized light in the combined light into a second circularly polarized light.

According to an exemplary embodiment of the present disclosure, the optical axis direction of the quarter wave plate is at an angle of 45 degrees with the polarization direction of the first linearly polarized light and the second linearly polarized light, respectively.

According to an exemplary embodiment of the present disclosure, the HUD device further comprises:

A light source configured to provide a backlight source for the first display image generator and the second display image generator;

A second polarizing beam splitter configured to decompose the light emitted by the light source into a third linearly polarized light and a fourth linearly polarized light, the polarization direction of the third linearly polarized light is the same as the polarization direction of the first linearly polarized light, the polarization direction of the forth linearly polarized light is the same as the polarization direction of the second linearly polarized light, the third linearly polarized light is emitted to the first display image generator, and the fourth linearly polarized light is emitted to the second display image generator.

According to an exemplary embodiment of the present disclosure, the HUD device further comprises:

A first reflector configured to receive the third linearly polarized light and reflecting the third linearly polarized light to the first display image generator;

A second reflector configured to receive the forth linearly polarized light and reflecting the forth linearly polarized light to the second display image generator;

According to an exemplary embodiment of the present disclosure, the reflective imaging element is a concave reflective mirror.

According to an exemplary embodiment of the present disclosure, both of the first display image generator and the second display image generator are liquid crystal display panels.

According to an exemplary embodiment of the present disclosure, the plurality of reflective imaging elements are two reflective imaging elements.

According to an exemplary embodiment of the present disclosure, the first image is a left-eye image and the second image is a right-eye image.

According to an aspect of the present disclosure, it provides a HUD system, comprises:

The HUD device according to any one of the exemplary embodiments above.

According to an exemplary embodiment of the present disclosure, the HUD system further comprises:

An image conversion device configured to convert the image to be displayed into a first image signal and a second image signal;

A luminance adjustment device configured to adjust the luminance of the light source in the HUD device.

A display mode control device configured to control a display mode of the HUD device, and load the first image signal and the second image signal into the first display image generator and the second image generator according to the display mode, respectively.

According to an exemplary embodiment of the present disclosure, the display mode contains a first display mode and a second display mode;

In the first display mode, the display mode control device controls the first display image generator to load the first image signal and controls the second display image generator to load the second image signal;

In the second display mode, the display mode control device controls the first display image generator and the second display image generator to turn on simultaneously, and controls the first display image generator and the second display image generator to load the same image signal.

According to an exemplary embodiment of the present disclosure, the display mode contains a first display mode and a second display mode;

In the first display mode, the display mode control device controls the first display image generator to load the first image signal and controls the second display image generator to load the second image signal;

In the second display mode, the display mode control device controls one of the first display image generator and the second display image generator to turn on, and controls the opened display image generator to load the image signal.

According to an exemplary embodiment of the present disclosure, the HUD system further comprises: a pair of polarized glasses, wherein the polarized glasses are linearly polarized glasses or circularly polarized glasses.

It should be understood that both the foregoing general description and the following detailed description are exemplary and explanatory only and are not restrictive of the present disclosure.

BRIEF DESCRIPTION OF THE DRAWINGS

The above and other features and advantages of the present disclosure will become more apparent by detailed description of exemplary embodiments with reference to the attached drawings. Apparently, the accompanying drawings in the following description show merely some embodiments of the present disclosure, and the ordinary skilled in the art may still derive other drawings from these accompanying drawings without creative efforts. In the drawings.

DETAILED DESCRIPTION

Figure 1:
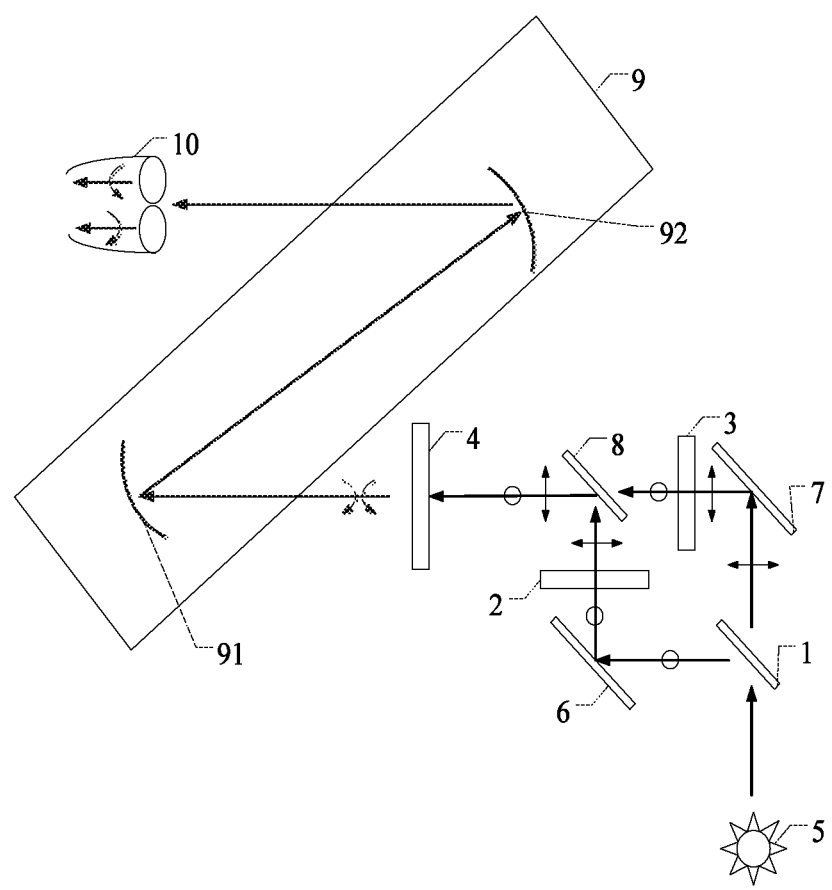
FIG. 1 is a schematic structural diagram of a HUD device according to the present disclosure.

Exemplary embodiments of the present disclosure will now be described more fully with reference to the accompanying drawings. However, exemplary embodiments of the disclosure may be embodied in many different forms and should not be construed as being limited to the embodiments set forth herein; in contrast, these embodiments are provided so that the present disclosure will be thorough and complete and will fully convey the concept of exemplary embodiments to those skilled in the art. The features, structures, or characteristics described herein can be combined in any suitable manner in one or more embodiments. In the following description, numerous specific details are given to provide a thorough understanding of embodiments of the present disclosure. However, those skilled in the art will recognize that the teachings of the present disclosure can be practiced without one or more of the specific details or with alternative methods, components, materials, device, steps, and the like. In other instances, well-known structures, methods, device, implementations, materials, or operations are not shown or described in detail to avoid obscuring aspects of the disclosure.

In addition, the drawings are merely schematic representations of the present disclosure rather than necessarily drawn to scale. The same reference numerals in the drawings identify the same or similar parts, and a repetitive description thereof will be omitted.

In the exemplary embodiment, a HUD device first disclosed. As shown in FIG. 1, the HUD device may comprise: a first display image generator 2, a second display image generator 3, a first polarizing beam splitter 8 and an optical component 9, herein:

A first display image generator 2 is configured to generate a first linearly polarized light containing a first image; a second display image generator 3 is configured to generate a second linearly polarized light containing a second image, wherein the polarization direction of the first linearly polarized light is perpendicular to the polarization direction of the second linearly polarized light.

In the exemplary embodiment, both of the first display image generator 2 and the second display image generator 3 may be liquid crystal display panels, and may also be, for example, TN (Twisted Nematic) panels, IPS (In-Plane Switching) panels, CPA (Continuous Flaming Arrangement) panels, or the like, which are not specifically limited in the present exemplary embodiment. Apart from the liquid crystal display panel, the first display image generator and the second display image generator may be other displays, such as organic light-emitting displays. An organic light-emitting display can produce linearly polarized light by adding a linear polarizer on the light-emitting side of the organic light-emitting display without a backlight source.

In the exemplary embodiment, the image to be displayed may be converted into a first image signal and a second image signal by the image conversion device. The first image signal may be a left-eye image signal and the second image may be a right-eye image signal, and no doubt, the first image signal may also be a right-eye image signal, and the second image signal may be left eye image signal. Based on this, the first display image generator 2 comprises a plurality of pixel units, and the state of the liquid crystal in each pixel unit can be changed by the first image signal to control the passage of the light, so that the first linearly polarized light, which is modulated by the first display image generator 2, contains the first image. Similarly, the second display image generator 3 comprises a plurality of pixel units, and the state of the liquid crystal in each pixel unit can be changed by the second image signal to control the passage of the light, so that the second linearly polarized light, which is modulated by the second display image generator 3, contains the second image.

The first image may be left-eye image, the second image maybe right-eye image. And no doubt, the first image may be right-eye image and the second image may be left-eye image, which is not specifically limited in the exemplary embodiment.

A first polarizing beam splitter 8 is configured to combine the first linearly polarized light and the second linearly polarized light.

In the exemplary embodiment, the first polarizing beam splitter 8 may be a prism polarizing beam splitter, flat-plate polarizing beam splitter, polarization beam splitter, or the like, which is not specifically limited in the exemplary embodiment. The first polarizing beam splitter 8 reflects the first linearly polarized light, transmits the second linearly polarized light, and then combines the first linearly polarized light and the second linearly polarized light. So the first linearly polarized light and the second linearly polarized light propagate in the common optical path to form stereoscopic display of the image.

The first display image generator 2 and the second display image generator 3 are arranged in mirror image with respect to the first polarizing beam splitter 8. Thus, the time when the first linearly polarized light propagates from the first display image generator 2 to the first polarizing beam splitter 8, is the same as the time when the second linearly polarized light propagates from the second display image generator 3 to the first polarizing beam splitter 8, thereby ensuring that the first image and the second image generated by the same image to be displayed simultaneously propagate to the user's eye.

An optical component 9 containing a plurality of reflective imaging elements is configured to reflect the first image and the second image into the user's eye.

In the exemplary embodiment, the optical component 9 may contain a plurality of reflective imaging elements. For example, the plurality of reflective imaging elements may be two reflective imaging elements 91, 92, and the plurality of reflective imaging elements may also be four reflective imaging elements, which are not specifically limited In the exemplary embodiment. The reflection imaging element may be a concave reflective mirror.

In the exemplary embodiment, the optical component may reflect the combined first linearly polarized light and second linearly polarized light, so the first image and the second image are reflected to the user's eye, and are visible to the users by means of polarized glasses 10, respectively. The user's brain further generates a stereoscopic image based on the first image and the second image. Visually, the stereoscopic images are rendered to users.

The position of the stereoscopic image may be in front of the vehicle or on the front windshield of the vehicle, which is not limited in the present exemplary embodiment. Research indicates that when the focal length of the staff is greater than 5 meters, his or her eye's focus range will greatly turn down. Therefore, in order to reduce the possible dizziness caused by the mismatch between convergence and focus, the transmission distance of the optical component 9 is set to 5 meters or more than 5 meters.

In the exemplary embodiment, a position adjustment control element may also be set on the optical component 9, thus the users can adjust the position of the reflective imaging element of the optical component 9 by the position adjustment control element, and then adjust the position of the stereoscopic image further. Specifically, the position adjustment control element may comprise a plurality of buttons, each of which represents an imaging position of one stereoscopic image. The users may adjust the position of the stereoscopic image to a position corresponding to the button with only a click of the button. The position adjustment control element may also be a rotary button. The users may change the position of the stereoscopic image by rotating the button.

Based on this, the HUD device further comprises: a quarter-wave plate 4 disposed between the first polarizing beam splitter 8 and the optical component 9, wherein the quarter-wave plate is used for converting the first linearly polarized light in the combined light into a first circularly polarized light, and converting the second linearly polarized light in the combined light into a second circularly polarized light.

In the exemplary embodiment, the first circularly polarized light may be left-hand rotation circularly polarized light, the second circularly polarized light may be right-hand rotation circularly polarized light. It should be noted that the first circularly polarized light still contains the first image after the first linearly polarized light is converted into the first circularly polarized light, and the second circularly polarized light still contains the second image after the second linearly polarized light is converted into the second circularly polarized light. In addition, the optical axis direction of the quarter-wave plate 4 is at an angle of 45 degrees with the polarization direction of the first linearly polarized light and the polarization direction of the second linearly polarized light, respectively.

It should be noted that the optical component 9 may reflect the combined first circularly polarized light and second circularly polarized light based on the quarter-wave plate 4. Thus, the first image and the second image are reflected to the user's eye and are visible to the users by means of polarized glasses 10, respectively. The user's brain further generates a stereoscopic image based on the first image and the second image. Visually, the stereoscopic images are rendered to users.

It should be noted that the quarter-wave plate described above may not be disposed. In this case, the combined first linearly polarized light and second linearly polarized light by the first polarizing beam splitter 8 will be reflected to user's eye, and then the combined one may be separated into the first linearly polarized light and second linearly polarized light by means of the linearly polarized glasses to the user's left eye and right eye, respectively. Thus, the user may further catch sight of the stereoscopic image.

Based on this, the HUD device may further comprise: a light source 5 configured to provide a backlight source for the first display image generator 2 and the second display image generator 3; and a second polarizing beam splitter 1 configured to decompose the light emitted from the light source 5 into a third linearly polarized light and a fourth linearly polarized light. The polarization direction of the third linearly polarized light is the same as the polarization direction of the first linearly polarized light, the polarization direction of the forth linearly polarized light is the same as the polarization direction of the second linearly polarized light, the third linearly polarized light is emitted to the first display image generator 2, and the fourth linearly polarized light is emitted to the second display image generator 3.

In the exemplary embodiment, the light source 5 may be natural light, linearly polarized light or the like, which is not limited in the present exemplary embodiment. To show color image, the light source 5 may be a white light beam, a monochromatic light beam or the like, which is not limited in the present exemplary embodiment.

The second polarizing beam splitter 1 may be a prism polarizing beam splitter, a flat-panel polarization beam splitter, a polarization beam splitter, or the like, which is not limited in the present exemplary embodiment.

As depicted in FIG. 1, the third linearly polarized light may be the light reflected by the second polarizing beam splitter 1 emitted from the light source 5, with the same polarization direction of the first linearly polarized light. The forth linearly polarized light may be the light reflected by the second polarizing beam splitter 1 emitted from the light source 5, with the same polarization direction of the second linearly polarized light.

The third linearly polarized light is emitted to the first display image generator 2, so that the first display image generator 2 modulates the third linearly polarized light to the first linearly polarized light containing the first image according to the first image signal. The forth linearly polarized light is emitted to the second display image generator 3, so that the second display image generator 3 modulates the forth linearly polarized light to the second linearly polarized light containing the second image according to the second image signal.

Based on this, the HUD device further comprises: the first reflector 6 configured to receive the third linearly polarized light and reflect the third linearly polarized light to the first display image generator 2; the second reflector 7 configured to receive the forth linearly polarized light and reflect the forth linearly polarized light to the second display image generator 3.

In the exemplary embodiment, the first reflector 6 is disposed on the optical path of the third linearly polarized light, configured to receive the third linearly polarized light decomposed by the second polarizing beam splitter 1 and reflect the received third linearly polarized light to the first display image generator 2. The second reflector 7 is disposed on the optical path of the forth linearly polarized light, configured to receive the forth linearly polarized light decomposed by the second polarizing beam splitter 1 and reflect the received forth linearly polarized light to the second display image generator 3. The reflector may be an element, such as reflective mirror, that can reflect incident light. The propagation path of the third linearly polarized light and the forth linearly polarized light may be changed by the first reflector 6 and the second reflector 7.

Figure 2:
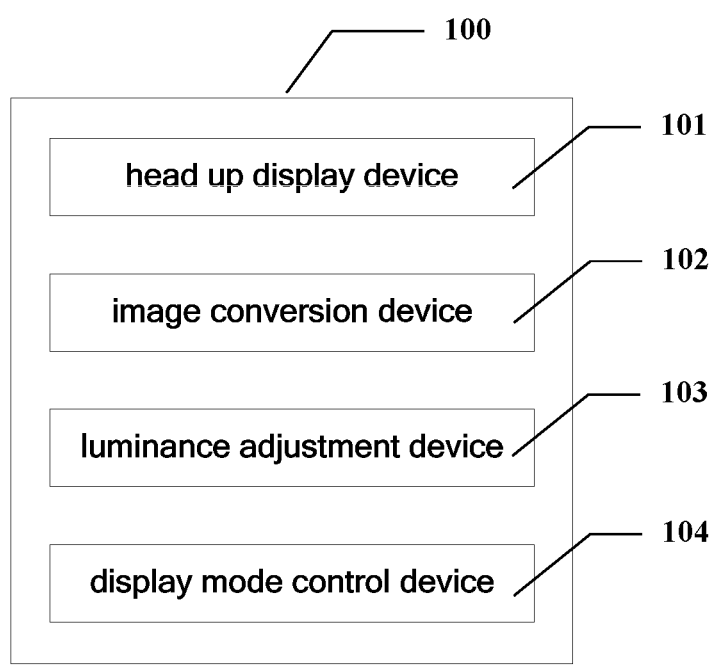
FIG. 2 is a block diagram of a HUD system of the present disclosure.

In the exemplary embodiment, as depicted in FIG. 2, a HUD system 100 is also provided, the HUD system comprises the HUD device as depicted in FIG. 1.

In the exemplary embodiment, the details of each section of HUD device 101 have been disclosed in the foregoing contents, and a repetitive description thereof will be omitted.

Based on this, the HUD device further comprises: an image conversion device 102, a luminance adjustment device 103 and a display mode control device 104, herein:

The image conversion device 102 may be configured to convert the image to be displayed into the first image signal and the second image signal.

In the exemplary embodiment, the image conversion device 102 is connected to the HUD device 101, configured to provide the HUD device 101 with the first image signal and the second image signal.

The luminance adjustment device 103 may be configured to adjust the luminance of the light source in the HUD device 101.

In the exemplary embodiment, the luminance adjustment device 103 is connected to the HUD device 101, configured to adjust the luminance of the light source, and then adjust the luminance of the stereoscopic image further. Specifically, the lower the luminance of the light source is, the lower the luminance of the stereoscopic image is; the higher the luminance of the light source is, the higher the luminance of the stereoscopic image is. A luminance adjustment physical button may be set on the luminance adjustment device 103, so that the user may adjust the luminance of the light source by the luminance adjustment physical button, then adjust the luminance of the stereoscopic image accordingly. Specifically, the user may adjust the luminance of the light source by the luminance adjustment device according to external environment. For instance, when the luminance of the stereoscopic image is low with respect to relatively high radiation, the user may see dark stereoscopic image, even no stereoscopic image. For that, the luminance of the stereoscopic image needs to be increased by increasing the luminance of the light source, so that the user can see a clear stereoscopic image; when the luminance of the stereoscopic image is high with respect to relatively low radiation, the stereoscopic image may be glaring or even stimulate to the user's eye, resulting in the reduction of comfort. For that, the reduction of luminance of the virtual image needs to be acquired by reducing the luminance of the light source. Thus, the stereoscopic image with moderate luminance is rendered to user for improving the use of comfort.

A display mode control device 104 is configured to control the display mode of the HUD device 101 and load the first display image generator and the second display image generator with the first image signal and the second image signal according to the display mode.

In the exemplary embodiment, the display mode control device 104 is connected to the HUD device 101, the mode of HUD device is under the control of the loaded image signal on the first display image generator and the second display image generator.

Specifically, the display mode may comprise a first display mode and a second display mode.

In the first display mode (i.e. a stereoscopic mode), the display mode control device controls the first display image generator to load the first image signal and the second display image generator to load the second image signal.

To maximize the utilization of light energy, in the second display mode (i.e. a planar mode), both of the first display image generator and the second display image generator are turned on simultaneously and loaded with the same image signal under the control of the display mode control device.

In order to conserve energy, in the second display mode (i.e. a planar mode), the display mode control device controls one of the first display image generator and the second display image generator to turn on, and controls the opened display image generator to load the image signal.

Based on this, the HUD device may further comprise a pair of polarized glasses. The polarized glasses may be linearly polarized glasses or circularly polarized glasses.

In the exemplary embodiment, the polarized glasses may be half-frame polarized glasses, full-frame polarized glasses, rimless polarized glasses or the like. The polarized glasses comprise a first polarizer and a second polarizer. The shapes of the first polarizer and the second polarizer may be set according to the user's preference, such as round, oval, square or the like, which is not limited in the exemplary embodiment.

With the linearly polarized glasses, the polarization direction of the first polarizer is the same as the polarization direction of the first linearly polarized light, the polarization direction of the second polarizer is the same as the polarization direction of the second linearly polarized light; Or the polarization direction of the first polarizer is the same as the polarization direction of the second linearly polarized light, the polarization direction of the second polarizer is the same as the polarization direction of the first linearly polarized light. On the basis of said linearly polarized glasses, the user's left and right eye may catch sight of the first image and the second image, respectively. Then the first image and the second image are combined to form a stereoscopic image by user's brain.

With the circularly polarized glasses, the polarization direction of the first polarizer is the same as the polarization direction of the first circularly polarized light, the polarization direction of the second polarizer is the same as the polarization direction of the second circularly polarized light; Or the polarization direction of the first polarizer is the same as the polarization direction of the second circularly polarized light, the polarization direction of the second polarizer is the same as the polarization direction of the first circularly polarized light. On the basis of said circularly polarized glasses, the user's left and right eye may catch sight of the first image and the second image, respectively. Then the first image and the second image are combined to form a stereoscopic image by user's brain.

It should be noted that the first polarizer and the second polarizer transmit natural light completely without affecting the user's normal observation.

In summary, an exemplary embodiment of the present disclosure provides HUD device and system. By providing a first display image generator, a second display image generator, a first polarizing beam splitter and an optical component, a first image and a second image are emitted to a user's eye, the stereoscopic imaging is further formed. In one aspect, the first linearly polarized light including the first image and the second linearly polarized light including the second image are generated based on the first display image generator and the second display image generator, and the first linearly polarized light and the second linearly polarized light are combined by the first polarizing beam splitter, so that the first linearly polarized light and the second linearly polarized light propagate in the common optical path to render stereoscopic display of the image; In another aspect, the first image and the second image are reflected to a user's eye by optical component to form a visible stereoscopic image by polarized glasses. By means of the HUD device, the user may select the display mode and adjust the position and luminance of the virtual image according to his or her requirement to get a better driving experience.

Other embodiments of the present disclosure will readily occur to those skilled in the art upon consideration of the specification and practice of the invention as disclosed herein. This application is intended to cover any variations, uses, or adaptations of the disclosure that follow the general principles of the disclosure and include what is generally known in the art, which is not disclosed in this disclosure, or is dependent on conventional techniques. It is intended that the specification and examples will be considered as exemplary only, with a true scope and spirit of the disclosure being indicated by the following claims.

It should be understood that the present disclosure is not limited to the precise structures that have been described above and shown in the drawings, and that various modifications and changes may be made without departing from the scope thereof. The scope of the disclosure is limited only by the terms of the appended claims.

What is claimed is:

1. A head up display device comprising:
   a first display image generator configured to generate a first linearly polarized light containing a first image;
   a second display image generator configured to generate a second linearly polarized light containing a second image; wherein the first image is a left-eye image and the second image is a right-eye image, and the polarization direction of the first linearly-polarized light is perpendicular to the polarization direction of the second linearly-polarized light;
   a first polarizing beam splitter configured to combine the first linearly polarized light and the second linearly polarized light; and
   an optical component containing a plurality of reflective imaging elements, wherein the optical component is configured to reflect the first image and the second image into a user's eye,
   wherein the first display image generator and the second display image generator are arranged in mirror image with respect to the first polarizing beam splitter, and the time when the first linearly polarized light propagates from the first display image generator to the first polarizing beam splitter is the same as the time when the second linearly polarized light propagates from the second display image generator to the first polarizing beam splitter, thereby ensuring that the first image and the second image generated by a same image to be displayed simultaneously propagate to the user's eye.

2. The head up display device according to the claim 1, further comprising:
   a quarter wave plate disposed between the first polarizing beam splitter and the optical component, wherein the quarter wave plate is configured to convert the first linearly polarized light in the combined light into a first circularly polarized light, and convert the second linearly polarized light in the combined light into a second circularly polarized light.

3. The head up display device according to the claim 2, wherein the optical axis direction of the quarter wave plate is at an angle of 45 degrees with the polarization direction of the first linearly polarized light and the second linearly polarized light, respectively.

4. The head up display device according to the claim 1, further comprising:
   a light source configured to provide a backlight source for the first display image generator and the second display image generator; and
   a second polarizing beam splitter configured to decompose the light emitted from the light source into a third linearly polarized light and a fourth linearly polarized light, the polarization direction of the third linearly polarized light is the same as the polarization direction of the first linearly polarized light, the polarization direction of the forth linearly polarized light is the same as the polarization direction of the second linearly polarized light, the third linearly polarized light is emitted to the first display image generator, the fourth linearly polarized light is emitted to the second display image generator.

5. The head up display device according to the claim 4, further comprising:
   a first reflector configured to receive the third linearly polarized light and reflect the third linearly polarized light to the first display image generator; and
   a second reflector configured to receive the forth linearly polarized light and reflect the forth linearly polarized light to the second display image generator.

6. The head up display device according to the claim 1, wherein the reflective imaging element is a concave reflective mirror.

7. The head up display device according to the claim 2, wherein the reflective imaging element is a concave reflective mirror.

8. The head up display device according to the claim 4, wherein the reflective imaging element is a concave reflective mirror.

9. The head up display device according to the claim 1, wherein both of the first display image generator and the second display image generator are liquid crystal display panels.

10. The head up display device according to the claim 1, wherein the plurality of reflective imaging elements are two reflective imaging elements.

11. A head up display system, comprising:
a head up display device, the head up display device comprises:
a first display image generator configured to generate a first linearly polarized light containing a first image;
a second display image generator configured to generate a second linearly polarized light containing a second image; wherein the first image is a left-eye image and the second image is a right-eye image, and the polarization direction of the first linearly-polarized light is perpendicular to the polarization direction of the second linearly-polarized light;
a first polarizing beam splitter configured to combine the first linearly polarized light and the second linearly polarized light; and
an optical component containing a plurality of reflective imaging elements, wherein the optical component is configured to reflect the first image and the second image into a user's eye,
wherein the first display image generator and the second display image generator are arranged in mirror image with respect to the first polarizing beam splitter, and the time when the first linearly polarized light propagates from the first display image generator to the first polarizing beam splitter is the same as the time when the second linearly polarized light propagates from the second display image generator to the first polarizing beam splitter, thereby ensuring that the first image and the second image generated by a same image to be displayed simultaneously propagate to the user's eye.

12. The head up display system according to any one of the claim 11, wherein further comprising: a pair of polarized glasses, wherein the polarized glasses are linearly polarized glasses or circularly polarized glasses.

* * * * *